Figure 1:
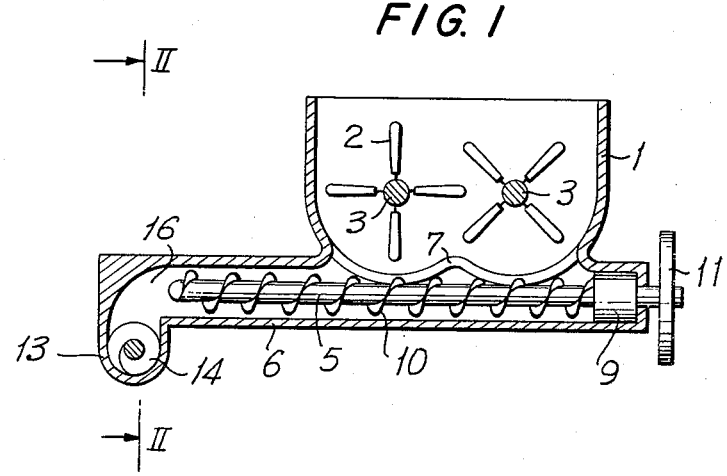

Nov. 9, 1965 R. ERNST 3,216,375
APPARATUS FOR MAKING ALIMENTARY PASTE PRODUCTS
Filed March 6, 1962 2 Sheets-Sheet 1

INVENTOR
ROBERT ERNST
BY
ATTORNEYS

Nov. 9, 1965 R. ERNST 3,216,375
APPARATUS FOR MAKING ALIMENTARY PASTE PRODUCTS
Filed March 6, 1962 2 Sheets-Sheet 2

INVENTOR
ROBERT ERNST
BY McGlew and Toren
ATTORNEYS

United States Patent Office 3,216,375
Patented Nov. 9, 1965

3,216,375
APPARATUS FOR MAKING ALIMENTARY
PASTE PRODUCTS
Robert Ernst, Sulgen, Switzerland, assignor to Gebrueder
Buehler, Uzwil, Switzerland, a firm of Switzerland
Filed Mar. 6, 1962, Ser. No. 177,806
Claims priority, application Switzerland, Mar. 7, 1961,
2,721/61
9 Claims. (Cl. 107—14)

This invention relates to an apparatus for making alimentary paste products, such as macaroni, spaghetti, and the like, and more particularly to a press wherein the paste is subject to vacuum.

Various types of such presses are already well known. In one of them a worm conveyor feeds the paste from a mixer into a large-capacity vacuum chamber below which a press worm is disposed. In the passage between the feed-worm and the vacuum chamber a perforated plate is placed with the object of vigorously compressing the paste before its being exposed to the vacuum for degassing. This however impedes degassing of the paste from inside. The first compression and kneading of the paste in the feed-worm reduces the quality of the finished product since sufficient processing takes place in the press-worm conveyor.

In another arrangement the paste is fed directly from the mixer into a press-worm conveyor having a rearwardly extended press-worm to accommodate a suitable vacuum pipe. The rear-turns of the worm push the material forward and prevent it from obstructing the vacuum pipe. The passage between the mixer and the press-worm conveyor does not ensure satisfactory vacuum sealing. Even a substantial increase of the vacuum pump capacity does not satisfactorily preclude the formation of air inclusions.

In a further design the feed-worm and press-worm are coaxially disposed. Both worm housings communicate by a passage having a large cross-section. This arrangement avoids over-processing of the paste. The vacuum-sealing is satisfactory, whereas the screw-housing is complicated and the accommodation of the vacuum pipe difficult on account of the danger of vacuum pipe obstruction.

This invention utilizes a new and novel arrangement of structures hitherto known, combining all their advantages while avoiding their disadvantages. It concerns an apparatus for making alimentary paste products, comprising a mixer, a feed-worm conveyor, a vacuum suction system and press-worm conveyor, wherein said feed-worm discharges freely into the press-worm, the press-worm housing having a vacuum chamber disposed above the rear-turns of the worm behind the discharge of the feed-worm and a suction pipe connected to said vacuum chamber.

The principal objects of this invention consist in the realization of an apparatus of the above character, providing perfect sealing of the vacuum system, worm-housings of simple design and an easily comprehensible lay-out of the various components.

In a further development of this invention the clearance between the feed-worm, and its housing may be increased over a distance of a few turns. Such an increase of the clearance reduces an otherwise possible paste pressure-rise in the feed-conveyor to a minimum, and frequently enables the use of a simple drive of constant speed for the feed-worm. In a still further development a feed-worm having a reduced length may also be used.

A particularly favourable flow of the paste from the mixer into the feed-conveyor can be realized if the passage-opening for the paste between the mixing-trough and the feed-worm, disposed at right angles to the mixer shaft, is of substantial length. In a combination comprising, for instance, a two-shaft-mixer, a passage having a length which exceeds the distance between the two mixer shafts is preferred.

Figure 2:
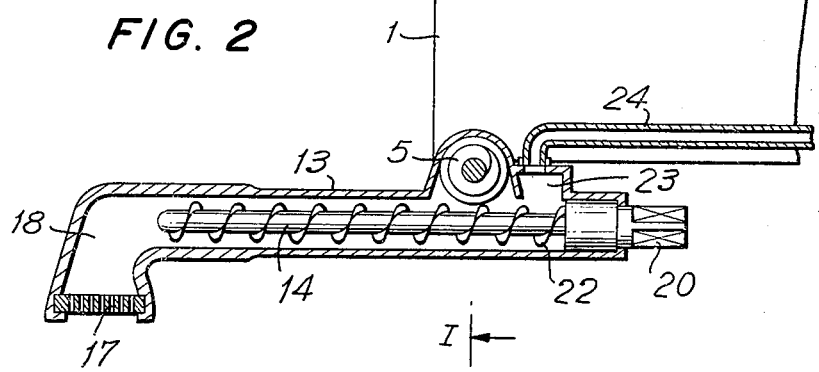
Figure 3:
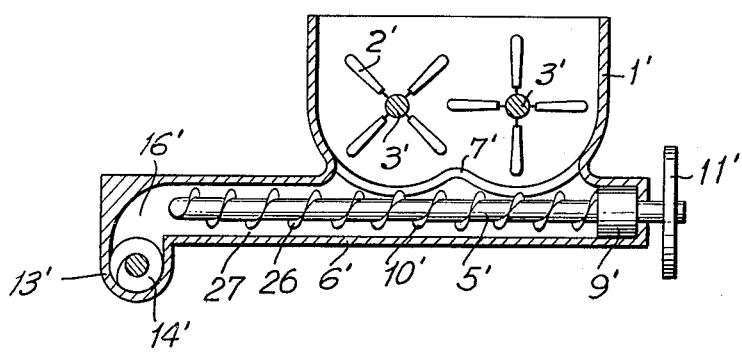
Figure 4:
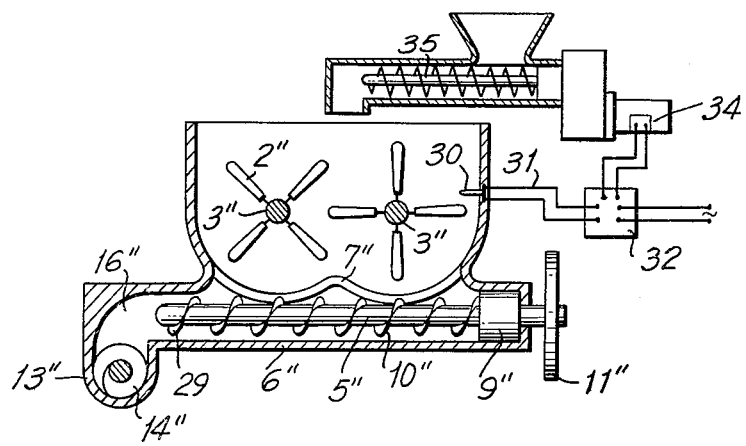

Further objects and advantages will become apparent upon consideration of the following description and the diagrammatic illustrations of three preferred embodiments in the appended drawings, wherein:

FIG. 1 shows a sectional view of the machine along the axis of the feed-worm and the line I—I in FIG. 2, FIG. 2 a sectional view of the machine along the axis of the press-worm and the line II—II in FIG. 1, FIG. 3 a sectional view of a second embodiment, along the axis of the feed-worm and a line II—II as in FIG. 1, FIG. 4 a similar sectional view as in FIG. 1 of a third embodiment of this invention.

As shown in FIGS. 1 and 2, a pair of shafts 3 provided with mixing paddles 2 are disposed in the mixing trough 1. A feed-worm 5 rotatably journalled in a substantially cylindrical housing 6 is disposed at substantially right angles in respect of mixing shafts 3. Cylinder 6 communicates with mixing chamber 1 through an oblong passage or bottom opening 7 having a length exceeding the distance between mixing shafts 3. Feed-worm 5 is journalled in cylinder 6 in a well-known manner by the peripheral worm surface 10 and a cylindrical portion 9 near the rear end of the worm. It is rotated by a driving element 11 at the rear end of the worm and a variator drive (not shown).

A press-worm 14 is disposed in a substantially cylindrical press-worm housing 13. Feed-worm housing 6 and press-worm housing 13 communicate by a free passage or discharge opening 16. The press-head 18 disposed at the discharge-end of press-worm housing 13 is provided with a customary die-plate or discharge die 17. At its rear-end press-worm 14 is provided with a shaft-end 20 for co-action with driving elements, such as a driving wheel cooperating with the main motor.

Above the rear-windings 22 of press-worm 14 a vacuum chamber 23 communicating with a vacuum suction pipe 24 is disposed behind discharge-passage 16 of feed-worm 5.

The paste prepared in the mixing chamber 1 falls through the passage 7 into the feed-worm 5 which feeds the paste through passage 16 into the press-worm 14. In the rear-end-turns of feed-worm 5 a plug of paste of a sufficient length is formed to ensure a satisfactory sealing of the vacuum chamber 23 against mixing chamber 1. The free passage 16 avoids excessive compression and undesirable processing of the paste. The loose condition of the paste thereby obtained promotes complete degassing taking place in the neighbourhood of vacuum chamber 23.

Press-worm 13 presses the paste at a relatively high pressure through die-plate 17 and the paste is prevented from escaping into vacuum chamber 23 by a plug of paste formed in the rear-turns of the worm. An additional protection against obstruction of the vacuum suction pipe 24 consists in the arrangement of the vacuum chamber 23 above press-worm 14 since paste which might enter the vacuum chamber 23 would fall down into the worm-conveyor.

In the embodiment shown in FIG. 3 a pair of shafts 3' provided with mixing paddles 2' are disposed in mixing trough 1'. Feed-worm 5' is journaled in a cylindrical housing 6' disposed at right angles to the mixing shafts 3'. Cylinder 6' communicates with mixing chamber 1' through an oblong passage or discharge opening 7'. Feed worm 5' is journaled in cylinder 6' by its peripheral end and rotated by a driving element 11'. A press-worm 14' is disposed in a cylindrical press-worm housing 13' which communicates by a free passage or discharge opening 16' with feed-worm housing 6'. However, the external diameter of feed-worm 5' is reduced over a length of some turns 26 relative to the remaining turns, thereby providing a fairly large clearance 27 with cylinder 6'. This clearance promotes a further reduction of the paste pressure while still ensuring satisfactory vacuum sealing effect. This enables worm 5' to rotate at constant speed.

In the embodiment illustrated in FIG. 4 a pair of shafts 3'' provided with mixing paddles 2' are disposed in the mixing chamber 1''. Feed-worm 5'' is journaled in a cylindrical housing 6'' disposed at right angles to mixing shafts 3''. Cylinder 6'' communicates with the mixing chamber through an oblong passage or discharge opening 7''. Feed-worm 5'' is journaled in cylinder 6'' by its peripheral worm surface 10'' and a cylindrical portion 9'' near its rear end and rotated by a driving element 11''. A press-worm 14'' is disposed in a cylindrical press-worm housing 13'' which communicates by a free passage or discharge opening 16'' with feed-worm housing 6''. However, the length of the feed-worm 5'' exceeds the length of passage 7'' by less than one turn, as indicated at 29, e.g. 1–2 cm. only, which enables reduction of the length of the worm-housing 6'' and also promotes prevention of too high an increase of the paste pressure. At one end of mixing chamber 1'' a level detector 30 of a known type is disposed for actuation of a regulator 32 through electric wiring 31. Regulator 32 controls the rotational speed of motor 34 which drives a feed worm conveyor 35 disposed at the inlet-end of mixing chamber 1'' to feed semolina at a rate that maintains the paste in the mixing chamber at a constant level. This arrangement makes a speed control for feed-worm 5'' superfluous. The same level-control is applicable in the embodiment shown in FIG. 3.

In the same manner as in the embodiment of FIGS. 1 and 2, in the embodiments of FIGS. 3 and 4, a vacuum chamber is provided at the rear end of the press worm conveyor housing and rearwardly of the feed worm conveyor housing.

I claim:

1. A device for making alimentary paste products comprising a mixer including a mixing container having a bottom opening and a mixing paddle movable in said mixer for mixing paste material therein, a feed cylinder arranged below said mixing container and having a discharge opening at one end and an opening therealong communicating with the interior of said mixer directly through the bottom opening of said container, a feed worm rotatable in said feed cylinder to advance the paste material out of said mixer and direct it to the discharge opening of said feed cylinder, a press worm conveyor including a press worm cylinder having a discharge die at one end and an inlet adjacent the opposite end connected to the discharge opening of said feed cylinder, a press worm rotatable in said press worm cylinder for receiving the paste material from the discharge opening of said feed cylinder and to subject the material to pressure and direct it through said discharge die, said press cylinder having a portion extending from the inlet of said press cylinder in a direction away from the discharge die and defining a vacuum chamber having an open bottom located above the level of the top of said press worm, said press worm having an inner end underlying the open bottom of said vacuum chamber, means connected to said vacuum chamber to produce suction therein, said press worm form operating in said press cylinder to prevent the escape of paste material beyond a predetermined point in said vacuum chamber.

2. The apparatus, according to claim 1, wherein said feed worm is comprised of a plurality of helically arranged screw threads, the diameters of some of said screw threads being smaller than the rest of said screw threads so as to permit a larger clearance between said smaller diameter threads and said feed cylinder's wall.

3. The apparatus, according to claim 1, wherein said feed worm is comprised of a plurality of helically arranged screw threads, the length of said feed worm being such that it exceeds the length of the bottom opening of said mixing container by less than the pitch dimension of said screw threads.

4. The apparatus, according to claim 1, wherein said mixing means includes a paste receiving trough and said apparatus further comprising a paste level detecting means for controlling the discharge of said mixed paste from said mixing means to said feed worm conveyor.

5. A device for making alimentary paste products comprising a mixer including a mixing container having a bottom opening, a feed cylinder arranged below said mixing container and having a discharge opening at one end and an opening therealong communicating with the interior of said mixer directly through the bottom opening of said container, a feed worm rotatable in said feed cylinder to advance the paste material out of said mixer and direct it to the discharge opening of said feed cylinder, a press worm conveyor including a press worm cylinder having a discharge die at one end and an inlet adjacent the opposite end connected to the discharge opening of said feed cylinder, a press worm rotatable in said press worm cylinder for receiving the paste material from the discharge opening of said feed cylinder and to subject the material to pressure and direct it through said discharge die, said press cylinder having a widened portion extending from the inlet of said press cylinder in a direction opposite to the discharge die and defining a vacuum chamber, means connected to said vacuum chamber to produce suction therein, said press worm operating in said press worm cylinder to prevent the escape of paste material beyond a predetermined point in said vacuum chamber, first and second mixing paddles mounted in said mixing container having rotational axes laterally spaced and extending across said container in spaced parallel relationship, the bottom opening of said container extending along the bottom transverse to the axes of said paddles and at least beyond the respective axis on each side of said mixing container.

6. Apparatus according to claim 1, including means in said mixing container for detecting the level of material therein for controlling the feed of material into said mixer in accordance with the level detected.

7. An apparatus according to claim 1, wherein said paddle is rotatable, said feed worm axis being disposed transversely to the axis of said paddle, said press worm axis being disposed at right angles to the axis of said feed worm.

8. Apparatus for making alimentary paste products, comprising; a paste mixing means including a mixed paste discharge opening, a feed worm conveyor arranged to receive the mixed paste through said discharge opening and convey it in a given direction away from the opening, a feed worm conveyor housing enclosing said feed worm conveyor communicating with said discharge opening to continuously receive paste material from said mixer under the influence of gravity, a press worm conveyor arranged for receiving the paste conveyed by said feed worm conveyor, and a press worm conveyor housing enclosing said press worm conveyor having an opening adjacent one end communicating with said feed worm conveyor housing, said press worm conveyor housing including means defining a vacuum chamber, having an open bottom located above the level of the top of said press worm conveyor, which is situated adjacent to the opening at which said press worm conveyor receives the paste from said feed worm conveyor, said press worm conveyor having an inner end underlying the open bottom of said vacuum chamber, said vacuum chamber being disposed rearwardly of the opening in said press worm conveyor housing in a direction opposite the flow direction of the paste through said press worm conveyor and the inner end of said press worm conveyor extending into said vacuum chamber, said vacuum chamber being sealed by the paste filling said press worm conveyor housing.

9. A device for making alimentary paste products according to claim 1, wherein said feed worm is of a length greater than the length of the bottom opening in said mixing container by less than a single feed worm turn.

References Cited by the Examiner

UNITED STATES PATENTS 2,777,403 1/57 Mladek _____ 107—14

FOREIGN PATENTS 448,769 1936 Great Britain.
568,093 3/45 Great Britain.
754,954 8/56 Great Britain.
319,207 3/57 Switzerland.

WALTER A. SCHEEL, *Primary Examiner.*

JOSEPH D. SEERS, CHARLES A. WILLMUTH, ROBERT E. PULFREY, *Examiners.*